(12) United States Patent
Venter et al.

(10) Patent No.: US 6,478,904 B1
(45) Date of Patent: *Nov. 12, 2002

(54) EMULSION EXPLOSIVE

(75) Inventors: Paul Nicolaas Venter; Francois Kruger, both of Secunda (ZA)

(73) Assignee: Sasol Chemical Industries Ltd. (ZA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/022,087

(22) Filed: Feb. 11, 1998

Related U.S. Application Data

(62) Division of application No. 08/567,183, filed on Dec. 12, 1995, now abandoned.

(30) Foreign Application Priority Data

Dec. 20, 1994 (ZA) .............................. 94/10111

(51) Int. Cl.$^7$ ................................ C06B 31/28
(52) U.S. Cl. ........................... 149/46; 149/61
(58) Field of Search ................. 149/2, 46, 61

(56) References Cited

U.S. PATENT DOCUMENTS

| | | | | | |
|---|---|---|---|---|---|
| 2,283,214 | A | * | 5/1942 | Kyrides | 252/356 X |
| 2,973,353 | A | * | 2/1961 | Gaertner | 252/356 X |
| 3,331,776 | A | * | 7/1967 | Krukziener | 560/198 X |
| 3,381,022 | A | * | 4/1968 | LeSuer | 560/198 X |
| 4,268,410 | A | * | 5/1981 | Allan et al. | 252/312 |
| 4,414,044 | A | * | 11/1983 | Takeuchi et al. | 149/2 |
| 4,828,633 | A | * | 5/1989 | Forsberg | 149/2 |
| 4,908,079 | A | * | 3/1990 | Tasaki et al. | 149/2 |
| 4,919,178 | A | * | 4/1990 | Riga et al. | 149/2 |
| 4,931,110 | A | * | 6/1990 | McKenzie et al. | 149/2 |
| 4,936,931 | A | * | 6/1990 | Nguyen et al. | 149/2 |
| 4,936,932 | A | * | 6/1990 | Nguyen | 149/2 |
| 4,986,858 | A | * | 1/1991 | Oliver et al. | 149/2 |
| 5,034,071 | A | * | 7/1991 | VanOmmeren | 149/7 |
| 5,160,387 | A | * | 11/1992 | Sujansky | 149/2 |
| 5,458,707 | A | * | 10/1995 | Delagey et al. | 149/60 |
| 5,500,062 | A | * | 3/1996 | Chattopadhyay | 149/46 |
| 5,920,031 | A | * | 7/1999 | Jahnke | 149/46 |

* cited by examiner

*Primary Examiner*—Edward A. Miller
(74) *Attorney, Agent, or Firm*—Libert & Associates; Victor E. Libert

(57) ABSTRACT

An emulsifier comprising at least one ester of a polyhydric composition and a mono-or poly-basic organic acid, the polyhydric composition preferably comprising a sorbitol and/or sorbitan derivative and the acid PIBSA.

9 Claims, No Drawings

EMULSION EXPLOSIVE

CROSS REFERENCE TO RELATED APPLICATION

This is a divisional application of application Ser. No. 08/567,183, filed Dec. 12, 1995 now abandoned in the name of Paul Nicholaas Venter et al and entitled "Emulsifier".

BACKGROUND OF THE INVENTION

This invention relates to an explosive emulsion containing an emulsifier which is particularly well suited for use in the preparation of explosive water-in-oil emulsions. P According to the invention there is provided an explosive emulsion containing an emulsifier which comprises at least one ester of a polyhydric composition and a mono-or poly-basic organic acid.

The polyhydric composition may be any suitable alcohol and/or sugar, the latter preferably comprising either a mono-, oligo-, or polysaccharide.

Preferably the polyhydric composition comprises a sorbitol and/or sorbitan derivative.

The organic acid may be one having a carbon chain of from 2 to 50 carbon atoms and may comprise any suitable saturated or unsaturated straight chain, branched, aromatic or cyclic carbon skeleton from the list of polymers or oligomers originating from α-olefins, alkenes, iso-alkenes and alkynes, examples of the foregoing being ethylene, propylene, butylene, isobutylene, pentene, benzene cyclohexane or cyclopentane.

Preferably the carbon chain of the acid includes as a substituent a poly isobutylene ("PIB") group having a molecular mass of between 300 and 2000, preferably in the order of 950.

Preferably, also, the acid comprises a di-basic acid, particularly succinic acid.

It will be appreciated that the hydrophilic properties of the emulsifier according to the invention are determined by the nature of the polyhydric part of the molecule which exhibits strong polarity.

The lipophilic properties of the emulsifier, again, are determined by the nature of the particular carbon chain.

Further according to the invention the emulsifier comprises a mixture of two or more of the following compounds:

a)

$$R-O-\overset{O}{\underset{\|}{C}}$$
$$HO-\overset{}{\underset{\underset{\|}{O}}{C}}-PIB$$

b)

$$R-O-\overset{O}{\underset{\|}{C}}$$
$$R-O-\overset{}{\underset{\underset{\|}{O}}{C}}-PIB$$

c)

$$R_1-O-\overset{O}{\underset{\|}{C}}$$
$$HO-\overset{}{\underset{\underset{\|}{O}}{C}}-PIB$$

d)

$$R_1-O-\overset{O}{\underset{\|}{C}}$$
$$R_1-O-\overset{}{\underset{\underset{\|}{O}}{C}}-PIB$$

e)

$$R-O-\overset{O}{\underset{\|}{C}}$$
$$R_1-O-\overset{}{\underset{\underset{\|}{O}}{C}}-PIB$$

f)

(sorbitol diester structure with PIB)

g)

(sorbitol diester structure with PIB)

h)

(sorbitan/fructose ester structure with PIB)

where PIB=

$$-CH_2-\underset{\underset{CH_3}{|}}{\overset{\overset{CH_3}{|}}{C}}-\left(CH_2-\underset{\underset{CH_3}{|}}{\overset{\overset{CH_3}{|}}{C}}\right)_{n-2}-CH_2-\underset{\underset{CH_3}{|}}{\overset{\overset{CH_2}{\|}}{C}}$$

with n=15 to 150, preferably 60–75;

R=Sorbitol

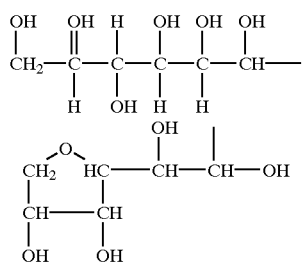

R₁=Sorbitan

DETAILED DESCRIPTION OF THE INVENTION

Applicant has found that an emulsifier comprising the aforesaid mixture is stable in an acid water-in-oil emulsion and that it can be used as an emulsifier in an emulsion having a pH as low as 0.5 and a temperature of up to 80° C.

It is known that polyisobutylenesuccinicanhydride ("PIBSA") related emulsifiers are susceptible to salt formation when used to form explosive water-in-oil emulsions from oxidiser solutions at low pH. The low pH, which is obtained through the addition of an acid, is desirable to effect gassing of the emulsion when a sodium nitrite gassing solution is subsequently added to the emulsion.

It will be appreciated that in the present invention the acid sensitivity of the PIBSA related emulsifiers is accommodated by utilising them as sugar based esters.

Applicant has also found that the emulsifier can form stable emulsions explosives in the presence of sulphonate salts used in the explosive art as crystal habit modifiers for ammonium nitrate.

The concentration of the emulsifier in such a water-in-oil emulsion can be from 0.1% to 3% by mass, but preferably it is from 0.6% to 1.5% by mass.

The emulsifier can be used to form a water-in-oil emulsion with a sufficiently high concentration of nitrates in the aqueous phase, to give an emulsion explosive.

The following table reflects the compositions of emulsion explosive according to the invention, the concentrations being expressed in mass percentages:

| Composition | General | Preferred | Most Preferred | |
| --- | --- | --- | --- | --- |
| | | | No 1 | No 2 |
| Nitrate salts | 0–35% | 0–15% | 0% | 0% |
| Emulsifier of the invention | 0.1–3.0% | 0.1–2.2% | 0.6% | 1.5% |
| Co-emulsifier | 0–2% | 0.1–0.8% | 0.25% | 0% |
| Phosphate ester | 0.01–2.0% | 0.1–1.0% | 0.0% | 0.4% |
| Oil | 2.5–20% | 5–11% | 6.5% | 6.5% |
| Water | 1–24% | 7–24% | 18.4% | 18.4% |
| Tartaric acid | 0.1–2.0% | 0.1–0.4% | 0.2% | 0% |
| Gassing reagent | 0.05–5% | 0.4–2.0% | 0.60% | 0.90% |
| Ammonium nitrate | Balance | Balance | 73.45% | 72.30% |
| pH | 0.5–6.5 | 2.5–5.8 | 2.5 | 5 |

The co-emulsifier can be sorbitan mono-oleate, referred to in the claims as "SMO", and/or other sorbitan derivatives and/or other polymeric emulsifiers.

Such an emulsion, which can be prepared in conventional manner, can be used as formed, or gassed at any suitable pH down to 0.5. The emulsion can also be used in conjunction with prilled ammonium nitrate, stabilised with sulphonate salts or otherwise stabilised, either as formed, or gassed.

As is indicated in the table, the emulsifier can also be used in conjunction with co-emulsifiers in order to address specific emulsion explosive properties.

The emulsifier according to the invention can be prepared in any suitable manner as is generally known for the preparation of such esters.

In the case where the polyhydric composition comprises sorbitol, and the organic acid a polyisobutylenesuccinicanhydride (PIBSA), the emulsifier according to the invention may be prepared comprising the following steps:

(a) 0.5 to 3.0 (preferably 1.0 to 1.5) mole sorbitol is heated to a temperature of between 60° C. and 160° C. (preferably 90° C. and 100° C.);

b) 0.5 to 4.0 (preferably 1.0 to 1.5) mole PIBSA is heated to a temperature of between 1000 and 200° C. (preferably between 100° and 120° C.);

c) 0–10,000 (preferably 0–100) ppm of a catalyst comprising one or more of the following: sulphuric acid, phosphoric acid, poly-phosphoric acid, titanium tetrachloride, ethanolamines, tin salts, organo-titanates, silica gel, hydrochloric acid, sulfonic acids, other metal salts and cationic-exchange resins, is added to one of the reagents;

d) the sorbitol is slowly added to the PIBSA in a suitable reactor, and the reaction mixture heated to a temperature of between 120° C. and 240° C. (preferably 150° C. and 160° C.);

e) the aforesaid temperature of the reaction mixture is regulated between the indicated values while taking samples at regular intervals for acid value tests;

f) as soon as the preferred acid value is reached (10mg–15mg KOH/g emulsifier), the reaction mixture is cooled to a temperature of <60° C.;

g) the emulsifier is transferred to a holding tank.

It will be appreciated that the invention also includes within its scope a gassed emulsion explosive including an emulsifier substantially as disclosed above.

It will be appreciated still further that there are no doubt many variations in detail possible with an emulsifier, an emulsion explosive, and their method of preparation according to the invention without departing from the spirit and/or scope of the appended claims.

What is claimed is:

1. An emulsion explosive composition comprising nitrate salts, water and oil in a water-in-oil emulsion, the composition containing from about 0.1 to 3% of an emulsifier comprising a mixture of at least two of the following compounds a) through h):

a)

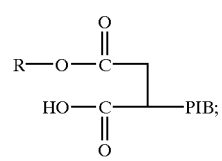

-continued b)

$$R-O-\overset{O}{\underset{\parallel}{C}}$$
$$R-O-\overset{O}{\underset{\parallel}{C}}-PIB;$$

c)

$$R_1-O-\overset{O}{\underset{\parallel}{C}}$$
$$HO-\overset{O}{\underset{\parallel}{C}}-PIB;$$

d)

$$R_1-O-\overset{O}{\underset{\parallel}{C}}$$
$$R_1-O-\overset{O}{\underset{\parallel}{C}}-PIB;$$

e)

$$R-O-\overset{O}{\underset{\parallel}{C}}$$
$$R_1-O-\overset{O}{\underset{\parallel}{C}}-PIB;$$

f)

HO—CH$_2$
HO—CH
H—C—O—C(=O)—PIB;
H—C—O—C(=O)
HO—CH
H$_2$—COH g)

HO—CH$_2$
HC—O—C(=O)
O—CH    HO—C(=O)—PIB
HO—CH
HC—O—C(=O)
HO—CH$_2$  HO—C(=O)—PIB; and h)

(furanose ring with OH substituents)
—CH(OH)—CH$_2$—O—C(=O)—
HO—C(=O)—PIB
O=C—C=O
PIB -continued where PIB =

$$-CH_2-\underset{CH_3}{\overset{CH_3}{C}}-\left(CH_2-\underset{CH_3}{\overset{CH_3}{C}}\right)_{n-2}-CH_2-\underset{CH_3}{\overset{CH_2}{C}}$$

with n=15 to 150

R=Sorbitol $$\underset{H}{\overset{OH}{CH_2}}-\underset{\underset{H}{OH}}{\overset{OH}{C}}-\underset{\underset{OH}{H}}{\overset{H}{C}}-\underset{\underset{H}{OH}}{\overset{OH}{C}}-\underset{\underset{H}{OH}}{\overset{OH}{C}}-CH- \quad \text{and;}$$

R$_1$=Sorbitan (sorbitan ring structure with OH groups)

2. The emulsion explosive of claim 1 wherein the ammonium nitrate comprises prilled ammonium nitrate, stabilised with sulphonate salts.

3. The emulsion explosive of claim 1 wherein the ammonium nitrate comprises prilled ammonium nitrate, stabilised with sulphonate salts.

4. The emulsion explosive of claim 1 having the following composition expressed in mass percentages, wherein:
   there is optionally present from 0 to 2% of a phosphate ester and from 0 to 2% of a co-emulsifier selected from the group consisting of one or more of (i) SMO, (ii) sorbitan derivatives other than the compounds a) through h), and (iii) polymeric emulsifiers other than the compounds a) through h);
   the oil is present in the amount of 2.5 to 20% and the water is present in the amount of 1 to 24%;
   the composition further comprises from 0.1 to 2.0% tartaric acid and from 0.05 to 5% gassing reagent;
   the nitrate salts comprise nitrate salts other than ammonium nitrate present in the amount of 0 to 35%;
   the balance of the composition comprises ammonium nitrate; and
   the pH of the composition is between 0.5 and 6.5.

5. The emulsion explosive of claim 1 having the following composition expressed in mass percentages, wherein:
   the composition further comprises from 0.1 to 1.0% of a phosphate ester and from 0.1 to 0.8% of a co-emulsifier selected from the group consisting of one or more of (i) SMO, (ii) sorbitan derivatives other than the compounds a) through h), and (iii) polymeric emulsifiers other than the compounds a) through h);
   the emulsifier is present in the amount of 0.1 to 2.2%, the oil is present in the amount of 5 to 11% and the water is present in the amount of from 7 to 24%;
   the composition further comprises from 0.1 to 0.4% tartaric acid and from 0.04 to 2% gassing reagent;
   the nitrate salts comprise nitrate salts other than ammonium nitrate present in the amount of 0 to 15%;
   the balance of the composition comprises ammonium nitrate; and
   the pH of the composition is between 2.5 and 5.8.

6. The emulsion explosive of claim 1 having the following composition expressed in mass percentages, wherein:
- there is present 0.25% of a co-emulsifier selected from the group consisting of one or more of (i) SMO, (ii) sorbitan derivatives other than the compounds a) through h), and (iii) polymeric emulsifiers other than the compounds a) through h);
- the emulsifier is present in the amount of 0.6%, the oil is present in the amount of 6.5 % and the water is present in the amount of 18.4%;
- the nitrate salts comprise ammonium nitrate present in the amount of 73.45%;
- the composition further comprises 0.2% tartaric acid and 0.6% gassing reagent; and
- the pH of the composition is 2.5.

7. The emulsion explosive of claim 1 having the following composition expressed in mass percentages, wherein:
- the emulsifier is present in the amount of 1.5%, the oil is present in the amount of 6.5% and the water is present in the amount of 18.4%;
- the composition further comprises 0.4% of a phosphate ester and 0.9% gassing reagent;
- the nitrate salts comprise ammonium nitrate present in the amount of 72.3%; and
- the pH of the composition is 5.

8. The emulsion explosive of claim 1 in which the poly isobutylene group has a molecular mass of between 300 and 2000.

9. The emulsion explosive of claim 1 in which the poly isobutylene group has a molecular mass of about 950.

* * * * *